United States Patent
Rekow et al.

(10) Patent No.: US 9,562,592 B2
(45) Date of Patent: Feb. 7, 2017

(54) METHOD FOR CONTROLLING GEAR SHIFT

(71) Applicant: Deere & Company, Moline, IL (US)

(72) Inventors: Andrew K. Rekow, Cedar Falls, IA (US); Dennis L. Jeffries, Waterloo, IA (US); Norbert Fritz, Ilvesheim (DE); David Mueller, Stutensee (DE); Rainer Gugel, Plankstadt (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/863,666

(22) Filed: Sep. 24, 2015

(65) Prior Publication Data

US 2016/0091063 A1  Mar. 31, 2016

(30) Foreign Application Priority Data

Sep. 25, 2014  (DE) .................. 10 2014 219 438
May 4, 2015  (DE) .................. 10 2015 208 160

(51) Int. Cl.
*B60K 1/02* (2006.01)
*F16H 3/72* (2006.01)
(Continued)

(52) U.S. Cl.
CPC .............. *F16H 3/728* (2013.01); *A01B 61/00* (2013.01); *B60K 6/365* (2013.01); *B60K 6/445* (2013.01);
(Continued)

(58) Field of Classification Search
None
See application file for complete search history.

(56) References Cited

U.S. PATENT DOCUMENTS 7,479,081 B2 *  1/2009  Holmes .................. B60K 6/365
                                        475/5
7,931,102 B2 *  4/2011  Katsuta .................. B60K 6/387
                                        180/65.21
(Continued)

FOREIGN PATENT DOCUMENTS

DE  19749074        5/1999
DE  102011087946 A1  6/2013
DE  102012204477    9/2013

OTHER PUBLICATIONS

European Search Report issued in counterpart application No. 15185924.6, dated Mar. 15, 2016 (6 pages).
(Continued)

*Primary Examiner* — Dirk Wright

(57) ABSTRACT

A method for controlling a power-split gear shift device in a vehicle by providing an electric variator and a transmission with variable gear shift and connecting a drive motor to a traction drive of the vehicle. The electric variator has a compound gear train with at least one first and at least one second electric machine. The method also includes providing a controller for the electric machines for steplessly varying a gear shift of the compound gear train. Upon detection of an external power requirement by an electric consumer, a gear shift region of the transmission with variable gear shift is set to operate the first electric machine in a generator mode and to operate the second electric machine to compensate for an existing power deficit or a power excess relative to an external power demand.

4 Claims, 13 Drawing Sheets

(51) Int. Cl.
    *B60W 30/188* (2012.01)
    *B60W 10/105* (2012.01)
    *B60W 10/26* (2006.01)
    *F16H 61/66* (2006.01)
    *A01B 61/00* (2006.01)
    *F16H 61/04* (2006.01)
    *F16H 61/686* (2006.01)
    *B60K 6/365* (2007.10)
    *B60K 6/445* (2007.10)
    *B60L 1/00* (2006.01)
    *F16H 37/08* (2006.01)

(52) U.S. Cl.
    CPC ............ *B60L 1/006* (2013.01); *B60W 10/105* (2013.01); *B60W 10/26* (2013.01); *B60W 30/188* (2013.01); *F16H 61/04* (2013.01); *F16H 61/66* (2013.01); *F16H 61/686* (2013.01); *B60W 2510/305* (2013.01); *B60W 2530/16* (2013.01); *B60W 2710/08* (2013.01); *B60W 2710/1005* (2013.01); *F16H 2037/0886* (2013.01); *F16H 2061/6603* (2013.01); *F16H 2200/2007* (2013.01); *F16H 2200/2023* (2013.01); *F16H 2200/2051* (2013.01)

(56) References Cited

U.S. PATENT DOCUMENTS

| | | | | |
|---|---|---|---|---|
| 8,047,314 B2* | 11/2011 | Oba | ......................... | B60K 6/40 180/65.265 |
| 8,231,491 B2* | 7/2012 | Oba | ....................... | B60K 6/365 180/65.25 |
| 8,251,165 B2* | 8/2012 | Katsuta | ................... | B60K 6/365 180/65.21 |
| 2008/0103002 A1 | 5/2008 | Holmes | | |

OTHER PUBLICATIONS

German Search Report in foreign counterpart application No. 102015208160.5, dated Jan. 25, 2016 (22 pages).

* cited by examiner

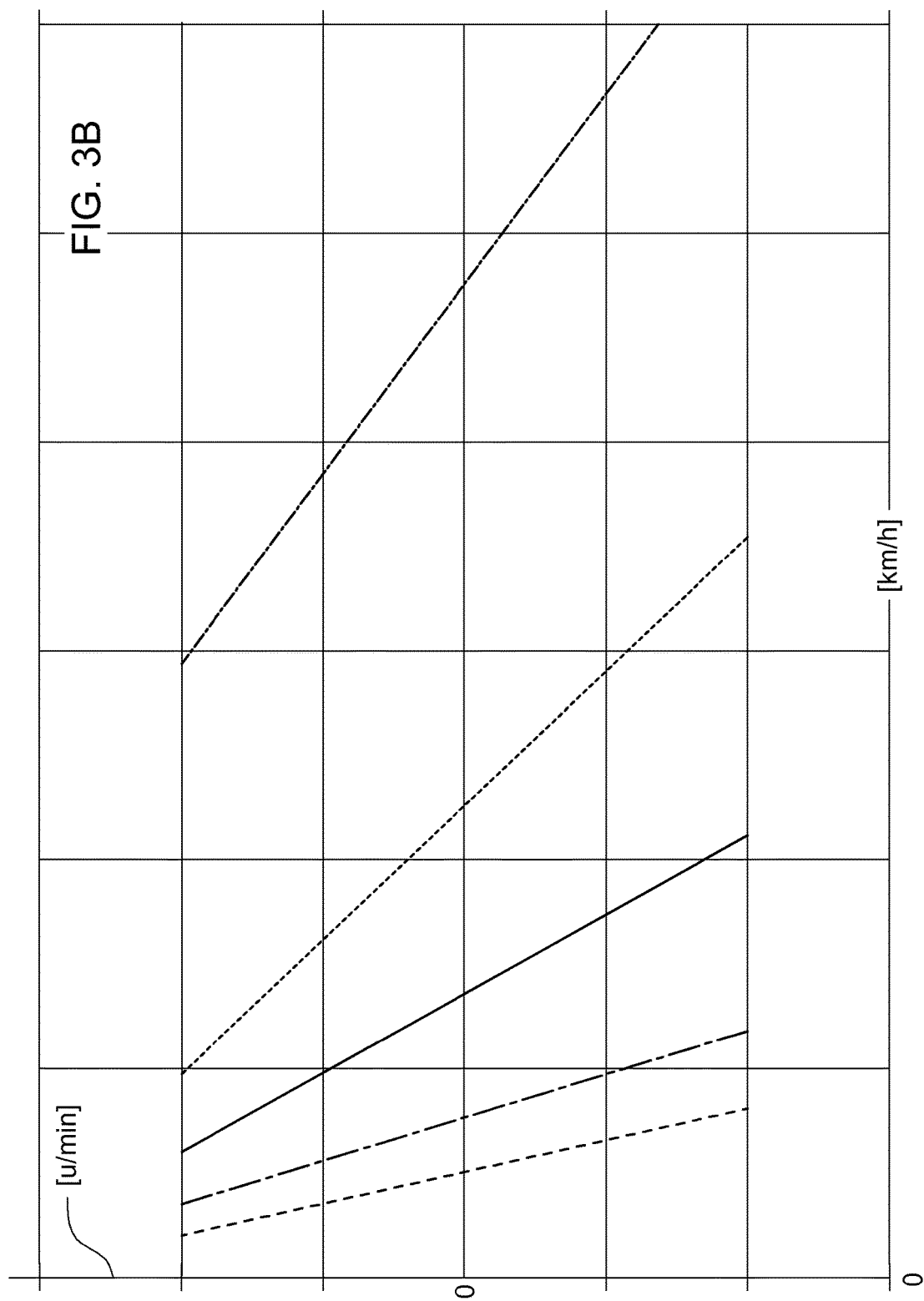

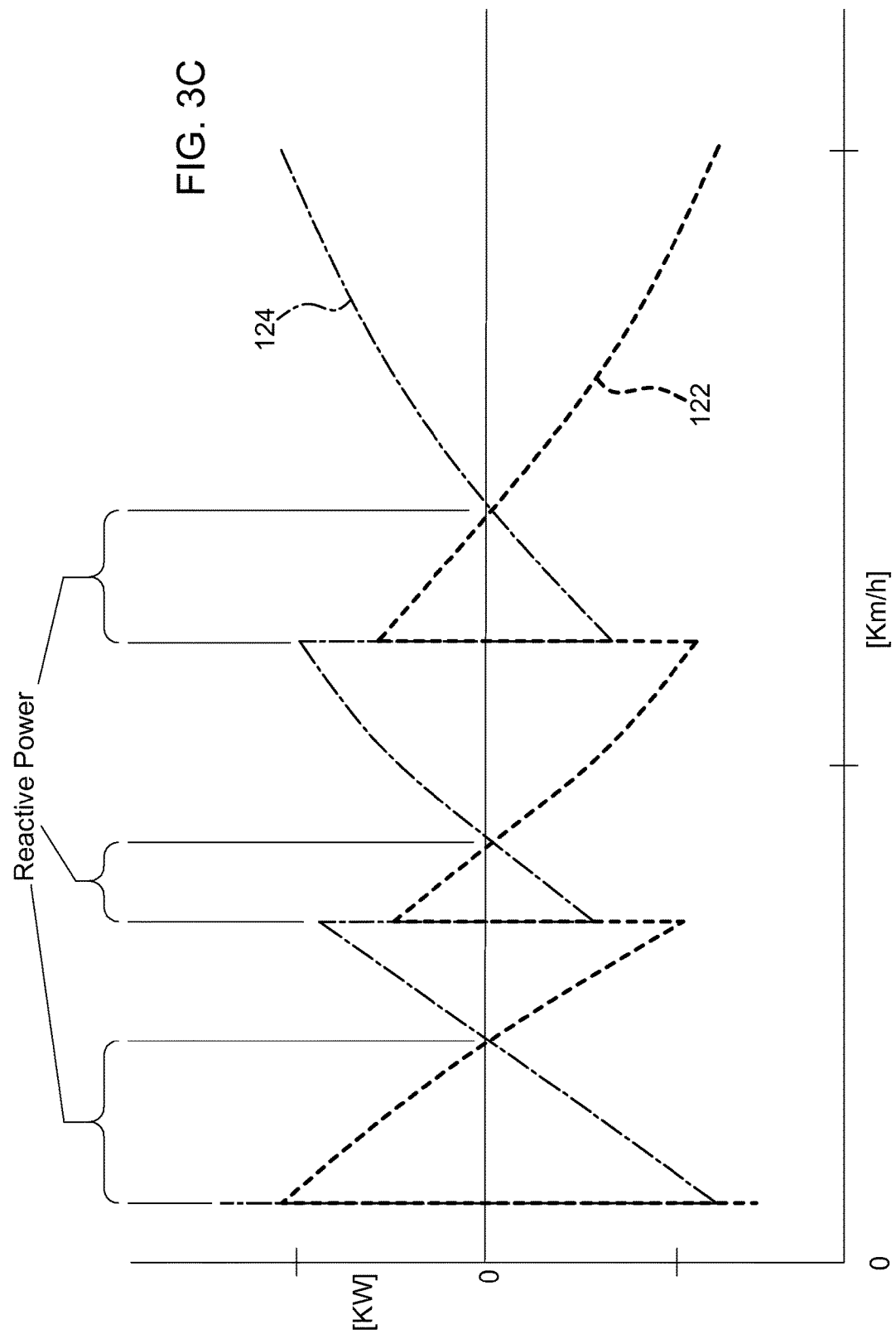

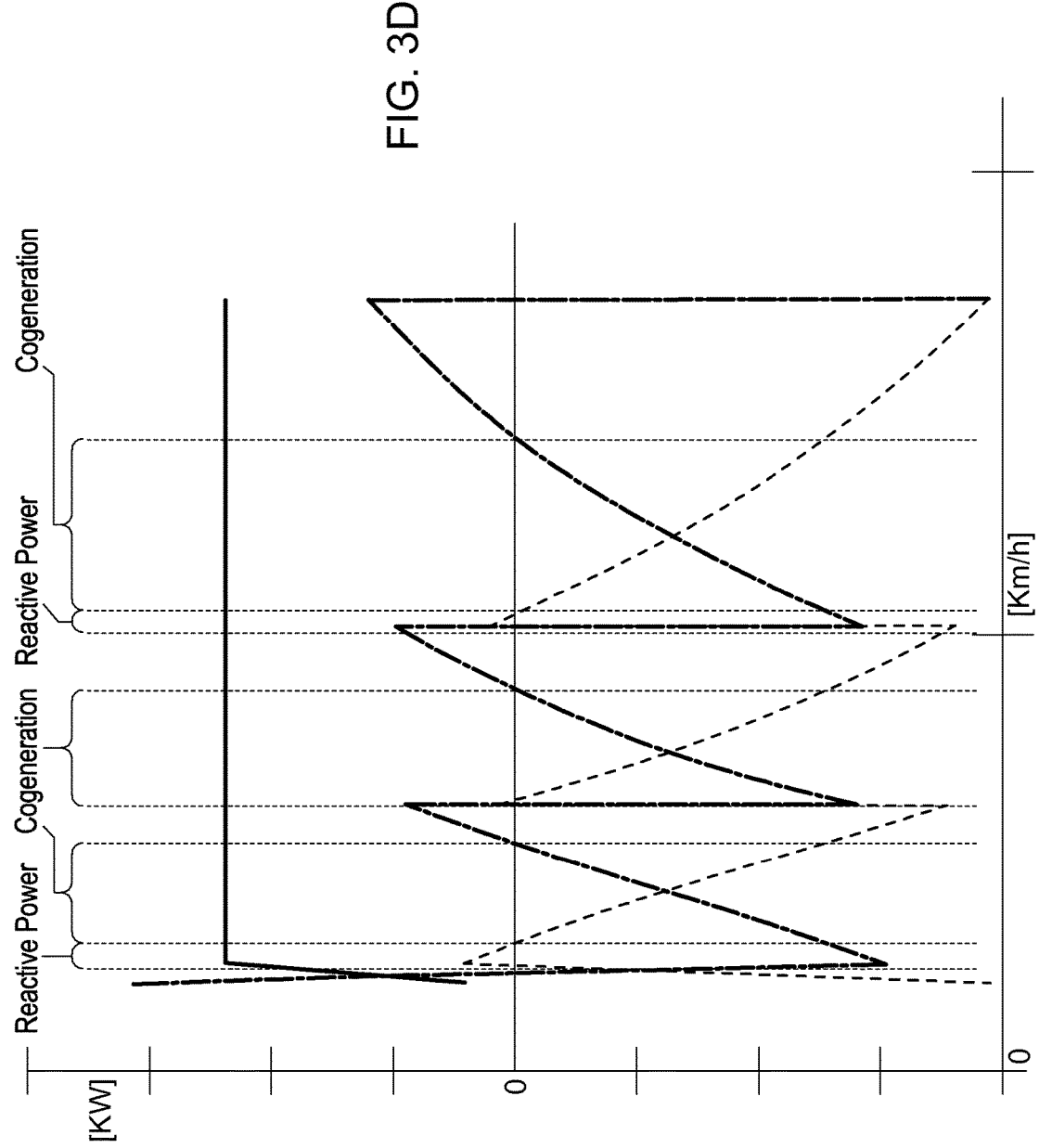

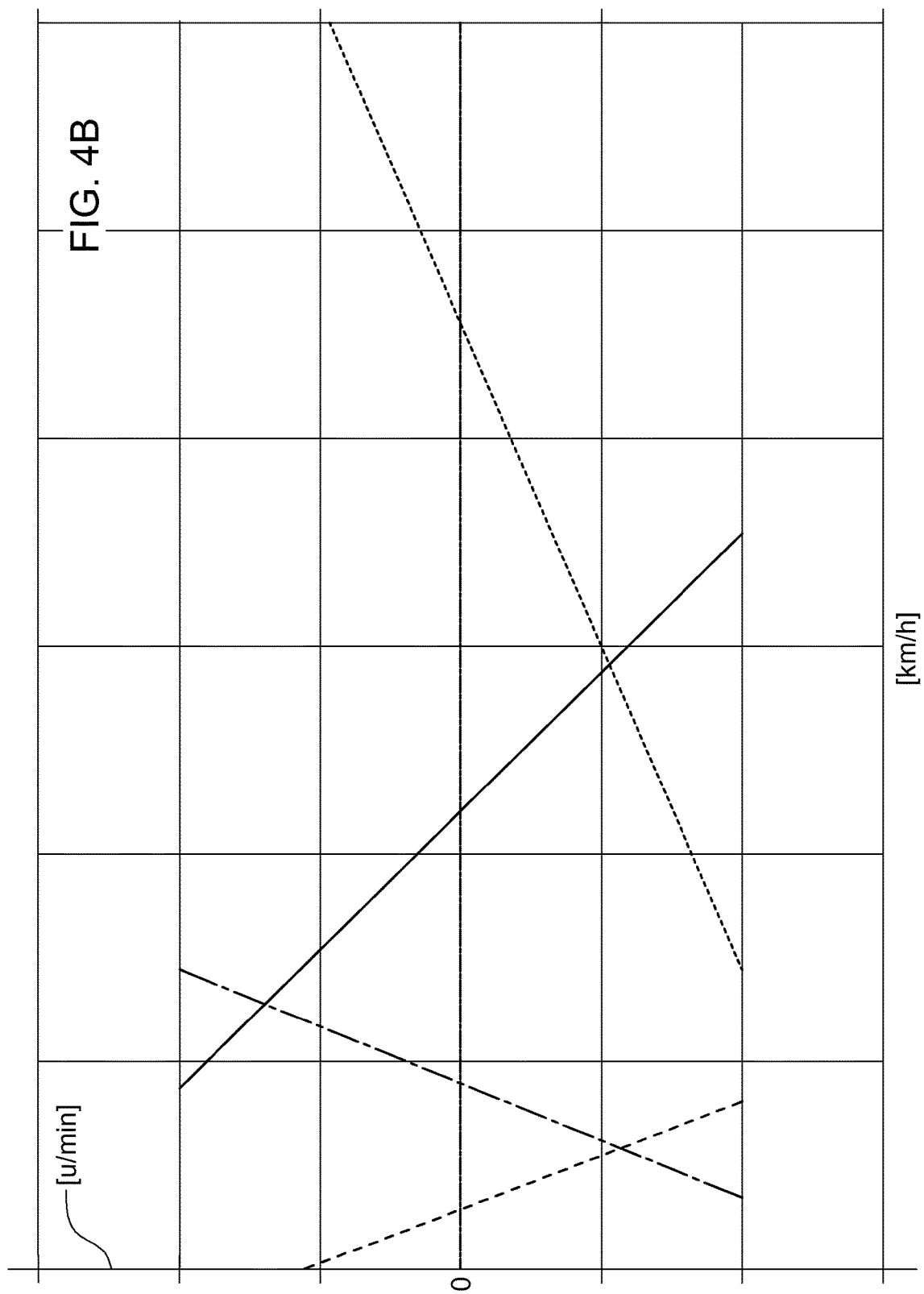

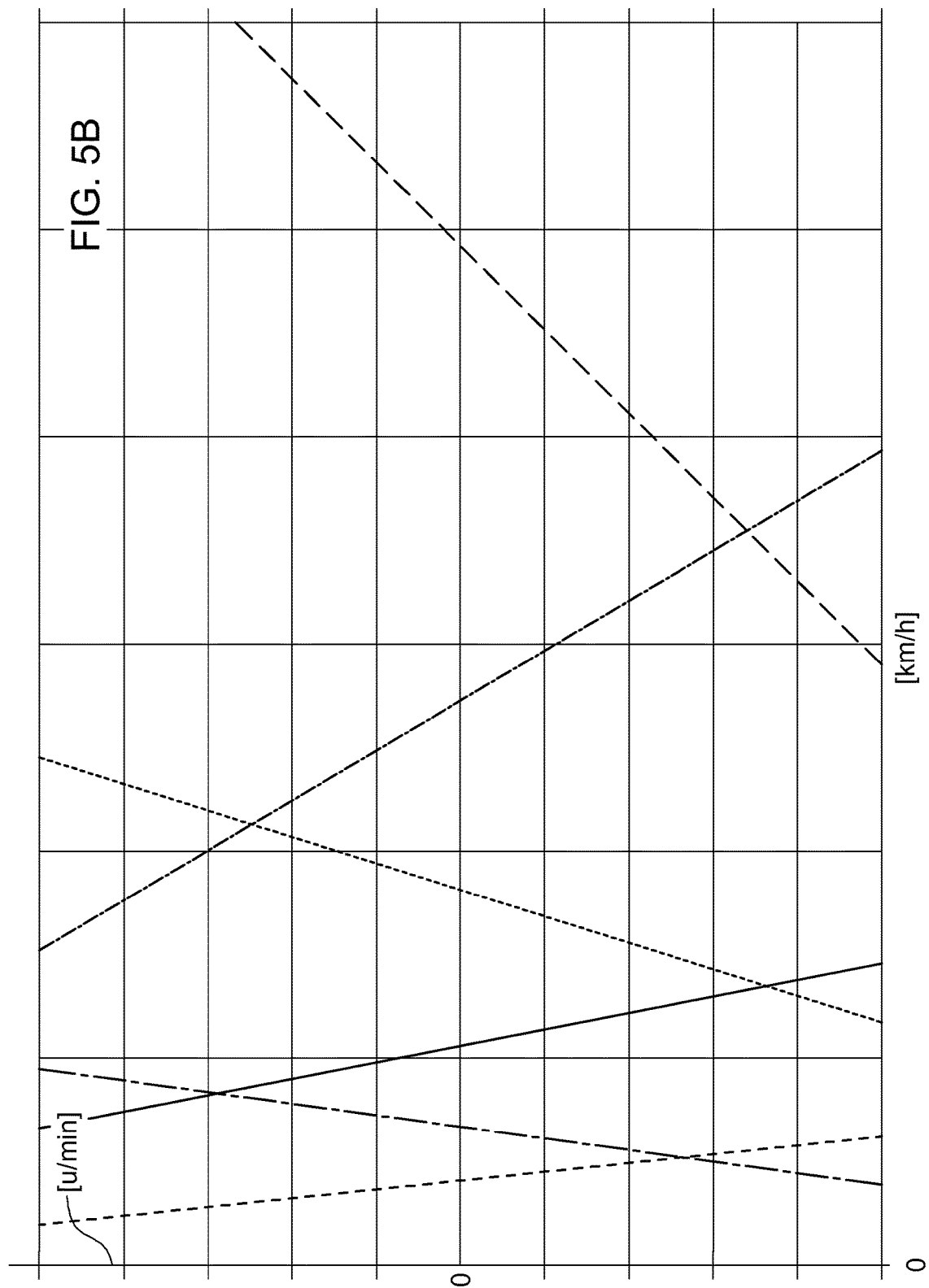

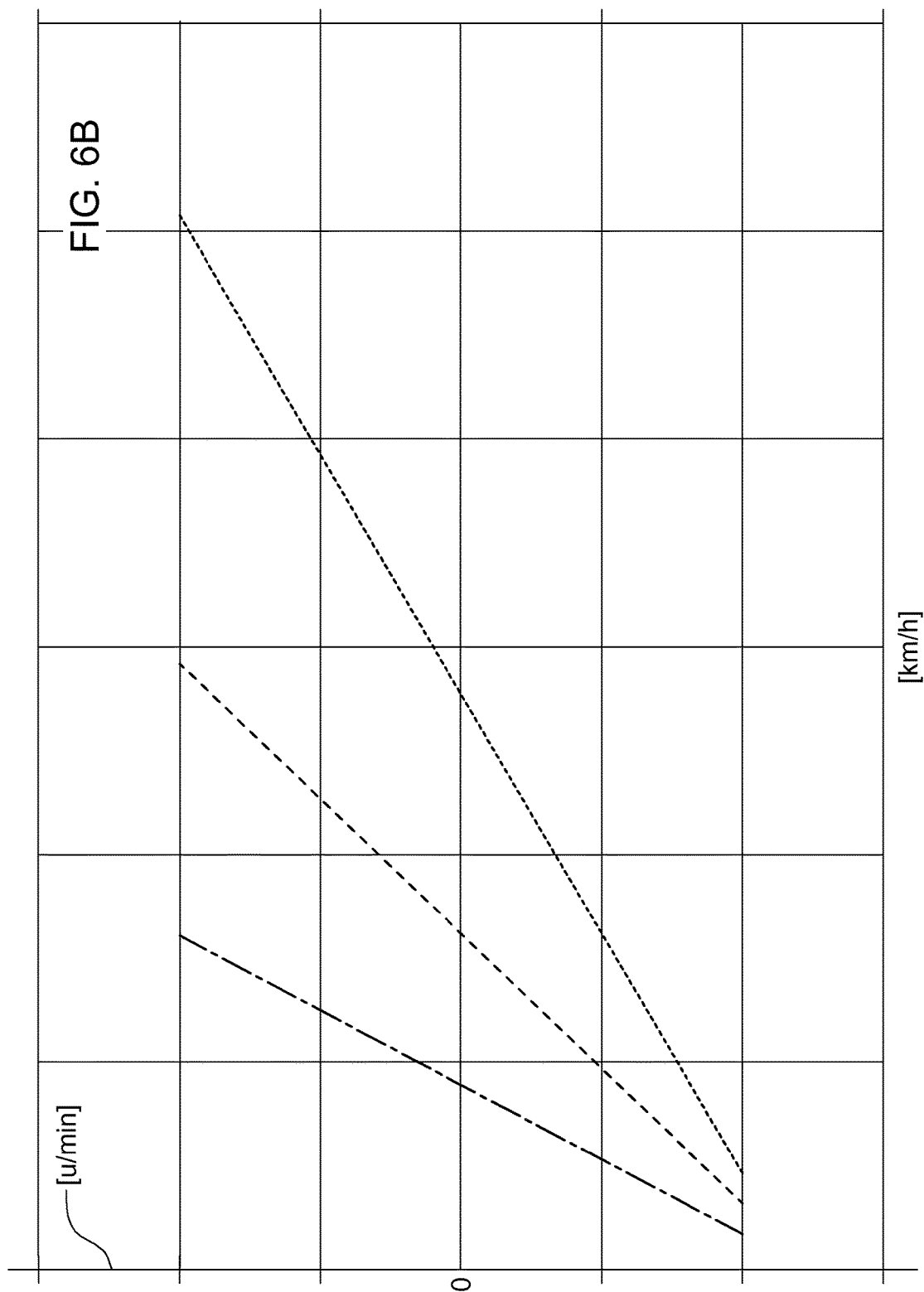

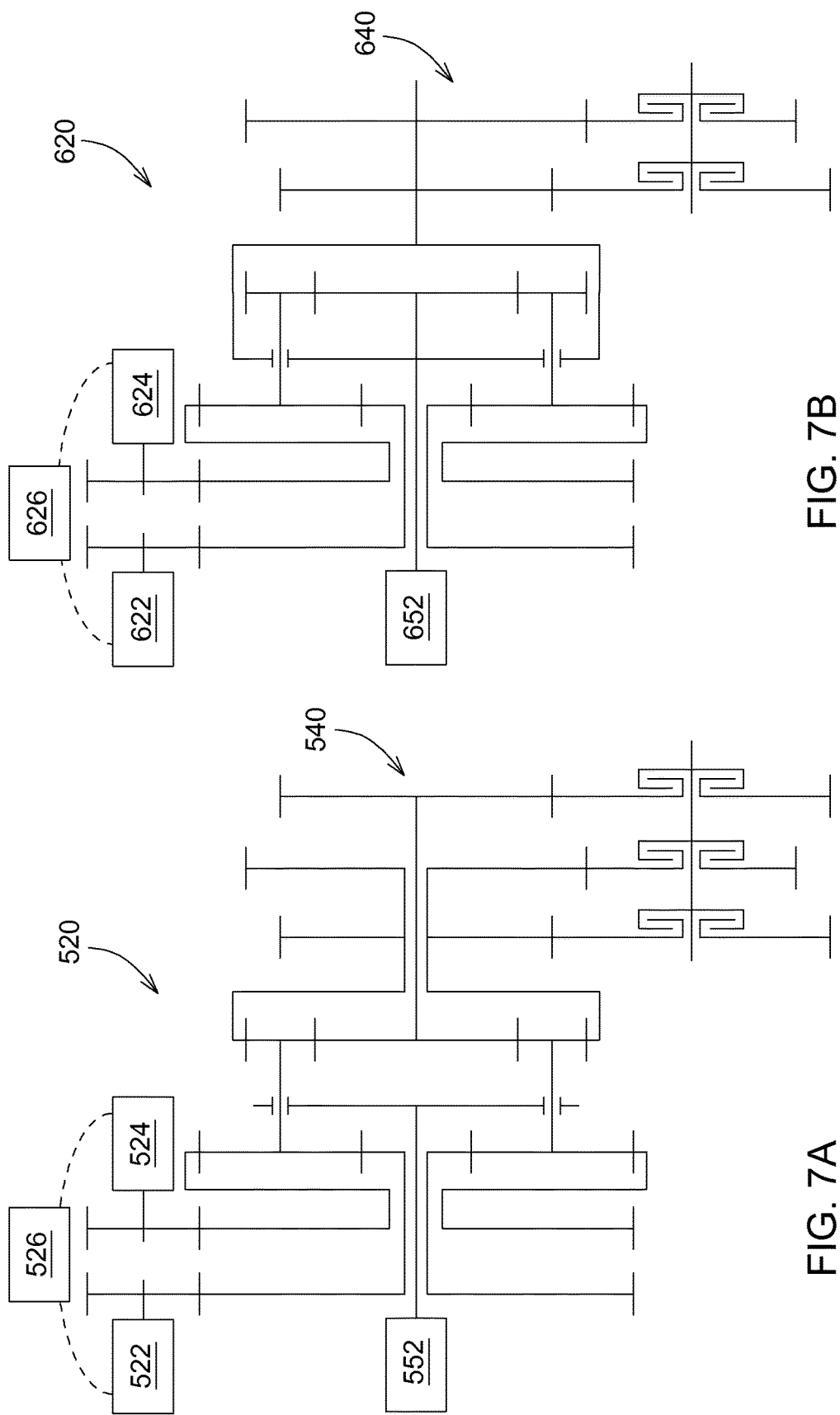

METHOD FOR CONTROLLING GEAR SHIFT

RELATED APPLICATIONS

This application claims the benefit of German Application Ser. No. 102014219438.5, filed Sep. 25, 2014 and of German Application Ser. No. 102015208160.5, filed May 4, 2015, the disclosures of which are hereby expressly incorporated by reference in their entirety.

FIELD OF THE DISCLOSURE

The present disclosure relates to a method for controlling a power-split transmission, in particular in a vehicle, wherein the gear shift device comprises an electric variator and a transmission with variable gear shift to connect a drive motor with a drive system of the vehicle and wherein the electric variator comprises, a compound gear train, at least one first and at least one second electric machine, and a control of the electric machine for stepless variation of a gear shift of the compound gear train.

BACKGROUND OF THE DISCLOSURE

Stepless power-split transmission devices are particularly common in the premium segment of construction machinery and agricultural work machinery, such as tractors, and are designed as hydraulic mechanical power-split transmissions. The power flow is thereby split in a mechanical path, which is regularly directed by means of one or a plurality of planetary gears, and in a hydrostatic path, in which the power is directed via a hydrostatic variator with which stepless adjustment of the gear shift can be performed. Such transmission devices are available on the market, for example, from manufacturers such as John Deere or Fendt.

Stepless power-split transmission devices are known in the art, such as in which the variable path is each designed as an electric variator. In these types of electro-mechanical transmissions both mechanical and electric power are used as drive power.

A different direction in the development of construction machines and agricultural work vehicles is in the construction of a second electric system in addition to the existing vehicle electric system that is operated with a higher nominal voltage with which electric consumers requiring such higher nominal voltage for operation can be driven. These electric consumers can be arranged both on the machine itself, as well as on an implement device.

Conventionally, this additional second vehicle electric system on the machine is produced by its own generating system provided for this purpose. This, however, incurs additional production costs and the overall efficiency is reduced due to additional building components.

SUMMARY

The present disclosure provides a method by which a second vehicle electric system on the vehicle can be supplied in an integrated manner. In one embodiment, for example, a method is provided where, upon detection of an external power requirement by an electric consumer, a gear shift region of the gear system with variable transmission is set in such a manner that the that the second electric motor is operated as a generator and the first electric machine is operated such that an existing power deficit or a power surplus relative to the external power demand is compensated.

The first electric machine can be operated by voltage regulation. This approach produces or consumes the electric power required for controlling the DC link. The second electric machine can be operated by rotational speed control. Electric power is thereby produced or consumed in order to set the gear shift region of the compound gear train via the rotational speed of the second electric machine dependent on the currently prevailing traction requirement of the vehicle. Cogeneration may be defined as a state in which both electric machines are operated as generators. External power requirement may be understood in this context as a power demand that exists outside of the transmission device. In this way, the external power requirement may, for example, be derived from an electric consumer arranged on the work vehicle or from an electric consumer arranged on the implement of the utility vehicle.

A power deficit and/or power excess may be understood in this context as a difference between the electric power produced by both of the electric machines or by only one of the two electric machines, and the amount of the external electric power demand may be understood to mean that a deficit is present when the external power demand exceeds the electric power generated, and that an excess exists when the electric power generated exceeds the external power requirement.

In one embodiment, the second electric machine may generate electric power at a certain level, but a higher external power is needed. In order to at least partially compensate for this difference, the first electric machine can also be operated as a generator. On the other hand, a different instance may occur where the second electric machine generates electric power at a certain level, but less external power is needed. In order to compensate for this difference, which then represents a power excess, the first electric machine is driven as a motor so as to absorb this excess power and to return it as reactive power into the compound gear train.

In another embodiment, reactive power circulation in a variator branch against the original direction can be used to cover an external power requirement. For this purpose, a gear shift region of the transmission with variable gear shift can be specifically set such that the compound gear train delivers power to the variator branch. This power delivered to the variator branch is not fed back as reactive power into the compound gear train because, according to this embodiment, it is directed by the second electric machine and by the controller as electric power to cover the external power demand. If the external power requirement cannot be met by the second electric machine alone, the first electric machine can also be operated as a generator, so that both electric machines are operated within the meaning of cogeneration. By means of two electric machines, an external power demand can be covered so that the power level of each individual machine and the corresponding electronics can be reduced.

In another embodiment, the compound gear train may be formed by a planetary gear with three drive interfaces, whereby, depending on the direction of power flow, the drive interfaces can act as an input or output for the planetary gear. It may be provided that the drive motor is in driving connection with the first drive interface of the planetary gear in order to provide the transmission with driving power which, in turn, can be transmitted to the traction drive via the transmission with variable gear shift, which is connected to the second drive interface of the planetary gear. The second of the two electric machines can be in driving connection with the third drive interface of the planetary gear so as to present a variable gear shift between the first drive interface and the second drive interface of the planetary gear. The second of the two electric machines may be in driving connection with the drive motor of the work vehicle, whereby this may be accomplished by interposing gear shift in the form of a spur gear stage.

While the working machine is being driven by the drive motor, the second electric machine can be operated in the generator mode and in engine operation. The generator operation generates electric power, which by definition has a negative sign, and the engine operation requires and/or consumes electric power. The power consumption in engine operation mode and/or the power output in the generator mode of the second electric machine is dependent on the torque required by the working vehicle and the rotational speed required by the second electric motor in order to achieve the gear shift in the planetary gear.

In the case of an external power requirement, a gear shift region of the transmission with variable transmission can be selected such that the second electric motor is operated in generator mode. The electric power supplied by the second electric machine in the generator mode can be provided to an external electric consumer via the controller in order to cover an existing external power requirement. Overall, the total efficiency obtained at the output shaft and the controller of the transmission can be increased by the transmission control method as described herein because the electric power from the second machine must be generated in any case in order to meet the torque demands. This electric power is not fed back as reactive power via the variator branch into the planetary gear, but is provided via the controller to an external electric consumer.

The gear shift region of the transmission may be set in consideration of a driving resistance, the external power demand, and a desired vehicle speed. This ensures that a gear shift region of the transmission with variable transmission, and/or a gear shift region that is different from the present one, will only then be controlled when the currently prevailing driving resistance and the speed of travel allow.

An energy storage connected with the controller is provided in order to compensate for an existing power excess or power deficit relative to the external power demand. This ensures that in the event of power excess even less power circulates as reactive power and in the event of power deficit power can be supplied from the energy storage.

The torque of the electric machines is adjusted via the controller independent of the rotational speed of the electric machines in order to feed energy into each of the electric machines or into an energy storage and to operate each of the two electric motors in generator mode.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 3A is a schematic of one embodiment of a drive arrangement for carrying out the gear shift control method of;

FIG. 3B is a speed-velocity diagram of the drive arrangement of FIG. 3A;

FIG. 3C is a graphical illustration of electric power flow over vehicle speed without transmission control for the drive arrangement of FIG. 3A;

FIG. 3D is a graphical illustration of electric power flow over the vehicle speed with transmission control;

FIG. 4B is a speed-velocity diagram for the drive arrangement of FIG. 4A;

FIG. 5B is a speed-velocity diagram for the drive arrangement of FIG. 5A;

FIG. 6B is a speed-velocity diagram for the drive arrangement of FIG. 6A;

FIG. 7A is a schematic of another embodiment of a drive arrangement for carrying out the gear shift control method; and FIG. 7B is a schematic of another embodiment of a drive arrangement for carrying out the gear shift control method.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
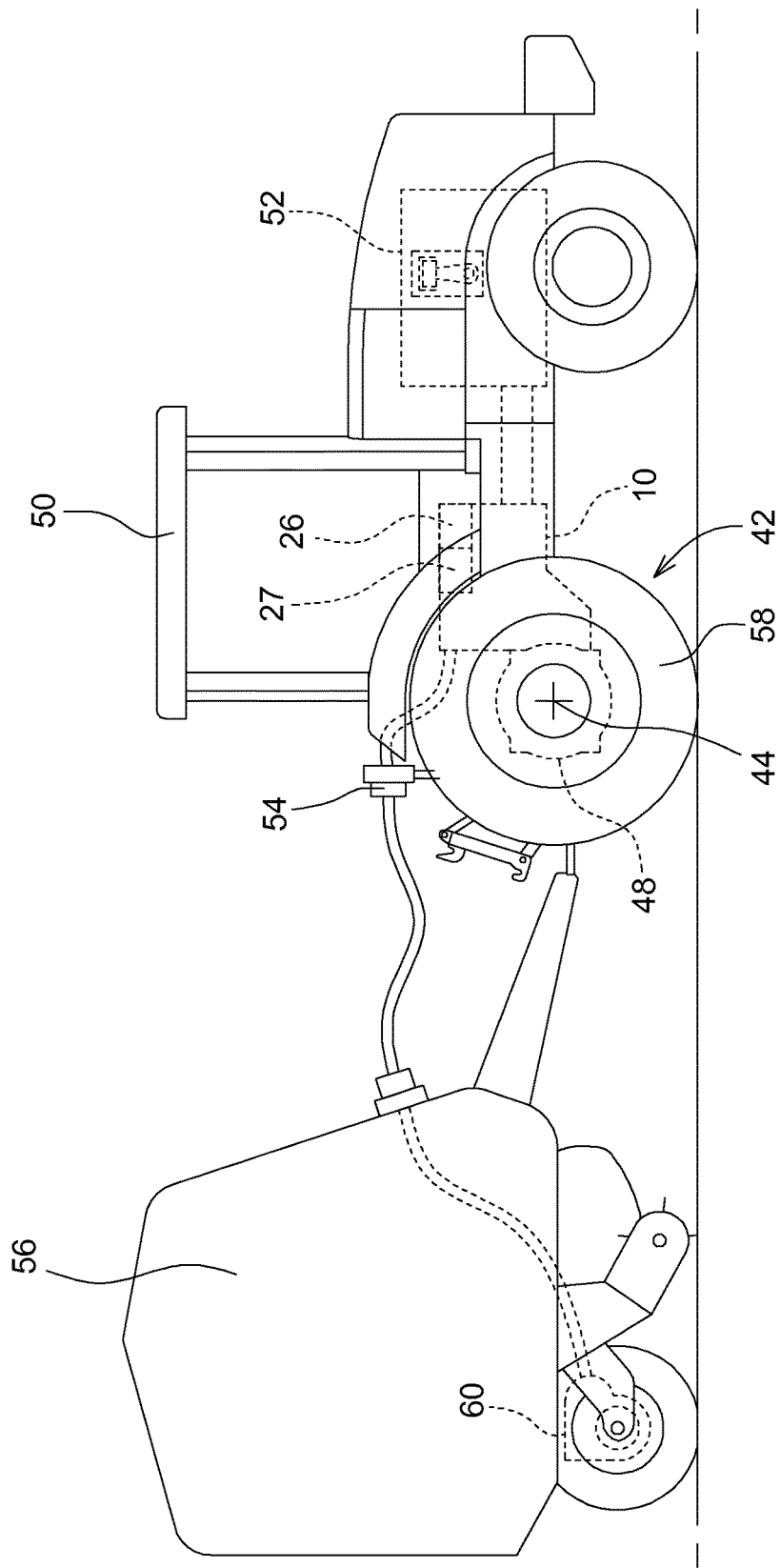
FIG. 1 is a side view of an agricultural work vehicle with an implement.

FIG. 1 shows an embodiment of an agricultural work vehicle 50 with a power-split transmission device 10, which is driven by a drive motor 52 and is constructed so as to provide electric power via a controller 26 and a power interface 54 in the form of an AEF connector to an electric consumer 60 in form of an electric drive axle on an implement 56. Further, drive power is transmitted to a drive system 42 via the transmission 10. The drive system 42 may have a differential transmission 48 and a drive axle 44 having wheels 58. In addition, an energy storage 27 connected to a controller 26 may be provided in order to store and dispense electric power. The energy storage device 27 may have, for example, a battery device. This arrangement represents only one possible example. Thus, the electric consumer 60 may neither necessarily be an electric drive axle, nor be arranged on the implement 56, but can be equally arranged on the work vehicle 50. In addition, instead of an AEF connector a different standardized or non-standardized interface can be employed.

Figure 2A:
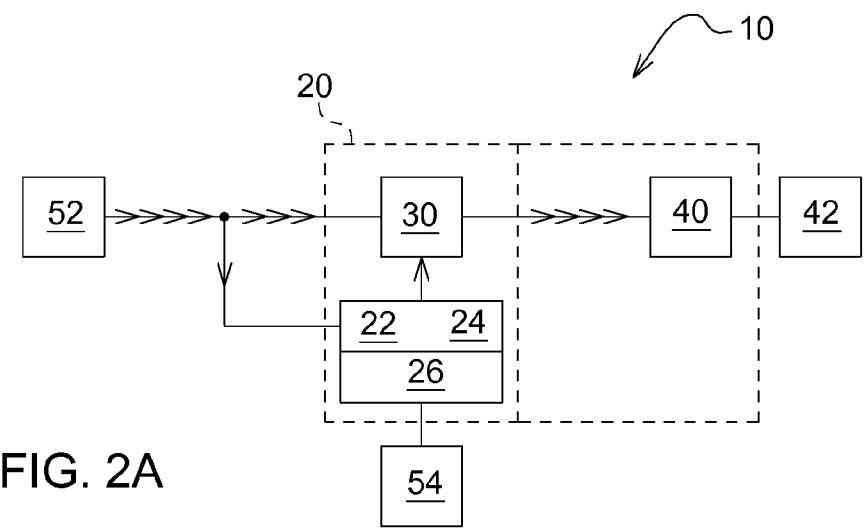
FIGS. 2A, 2B, and 2C are block diagrams of various embodiments of a drive arrangement with various power flows.
Figure 2B:
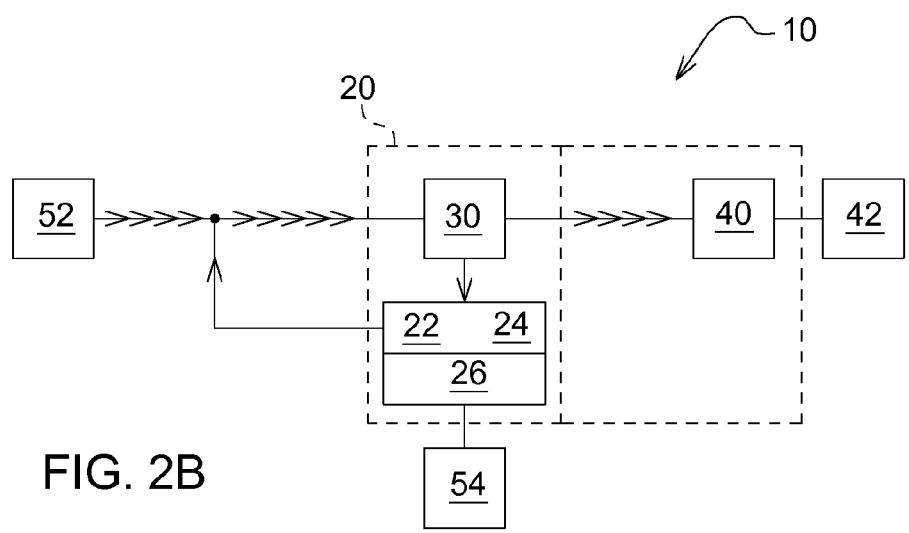
Figure 2C:
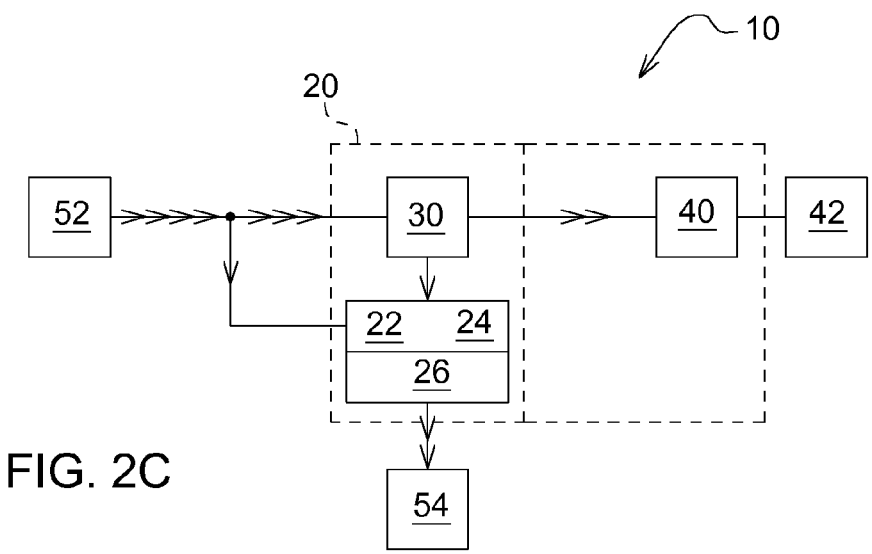

FIGS. 2A, 2B, and 2C show various drive arrangements of the agricultural work vehicle 50. A drive motor 52 in the form of a combustion engine transmits its drive power to a transmission device 10. Starting from the transmission device 10, the drive power is transmitted to a drive system 42 that may have components such as a differential gear and a drive axle with wheels.

The transmission device 10 may have a variator 20, having at least one compound gear train 30, at least one first electric machine 22, at least one second electric machine 24 and a controller 26, and a transmission with variable transmission 40.

A stepless gear shift in the compound gear train can be set via the second electric machine 24. The gearbox with variable transmission 40 can be implemented as a range gear box having, in one non-limiting example, five shifting arrangements A, B, C, D, E. In a specific configuration, the transmission 40 can be implemented as a dual-clutch transmission or as a continuously variable transmission. The controller 26 can be connected via a power interface 54 to an electric consumer. The transmission device 10 may also include, as needed, a shiftable counter gear 28, which may be embodied as a planetary gear and have a creeper 46, added as needed. Both the counter gear 28 as well as the creeper can be arranged upstream or downstream of the compound gear train 30.

Torque adjustment for the two electric machines 22, 24 can be carried out via the control system 26 independent of the speed of the two electric machines 22, 24. Depending on the gear shift to be set for the compound gear train 30, the second electric machine 24 can be operated in one direction of rotation in the motor mode and in the opposite direction in the generator mode. If a gear shift is set for the compound gear train 30 for which motor operation of the second electric machine 24 is needed, the first electric machine 22 is operated in generator mode and the electric power thereby generated made available to the second electric machine 24 for operating its motor.

This case of controlling is qualitatively illustrated in FIG. 2A. The arrowheads show the flow of power units, whereby a power unit is symbolized by an arrowhead. It is assumed that the drive motor 52 delivers four power units, of which three power units flow to the compound gear train 30 and one power unit flows via the variator 20 into the compound gear train 30, so that four power units flow in the direction of the manual transmission 40.

If a gear shift is to be set for the compound gear train 30 for which generator operation of the second electric machine 24 is needed, electric power is thereby generated that can be made available to a different electric consumer. Here, two scenarios are to be distinguished from each other: In the first scenario, there is no external power requirement, so that the controller 26 drives the first electric machine 22 in engine operation mode and provides the electric power generated by the second electric machine 24 to the first electric machine 22. This first scenario can be qualitatively illustrated by FIG. 2B. Again, it is assumed that the drive motor 52 delivers four power units. Since the second electric machine 24, however, is operated in generator mode, one power unit for driving the second electric machine 24 flows via the compound gear train 30. This power unit, which is not delivered to the outside, flows through the first electric machine 22 that is run in motor operation mode back to the inputs of the compound gear train 30, so that together with the four power units delivered by the drive motor 52, five power units flow into the compound gear train 30. Since a power unit flows in turn to drive the second electric motor 24, four power units flow in the direction of transmission 40. This power excess from one power unit within the compound gear train 30 develops as a result of the reactive power counter flowing via the variator 20.

In the second scenario, an external power requirement exists, so that the electric power generated by the second electric machine 24 can be provided to an external consumer, for example, an electric drive axle of an implement. This scenario can be qualitatively illustrated by FIG. 2C. In FIG. 2C, the power unit generated by the second electric machine 24 is made available to an external electric consumer via the controller 26 and the AEF connector 54, in order to cover a corresponding external power demand. In addition, the first electric machine 22 is controlled by the controller 26 in generator mode and the two power units produced generated by the electric machines 22, 24 are provided to an external electric consumer via the AEF connector 54. Accordingly, only two power units flow in the direction of the drive system 42. In only one specific aspect, which is not shown here, can the controller 26 control the first electric machine 22 that is in an idle state, so that correspondingly, of the four power units of the drive motor 52, only three power units flow in the direction of the drive motor 42 and one power unit flows via the AEF connector 54.

Various possible embodiments of transmission devices and the corresponding implementation of the gear shift control method is described with reference to FIGS. 3A-7B. Principally, in the previously described transmission devices, a distinction is made between one configuration (e.g., FIGS. 3A, 3B, 4A, 4B) in which a change of gear shift in the transmission 40 needs a gear shift jump in the second electric machine 24 to be performed, and a second configuration (FIGS. 4A-5B) in which a change of gear shift in the transmission 40 does not need gear shift jump, or only a very small one to be performed in the second electric machine 24. Further, the transmission devices of FIGS. 3A-5B represent initially coupled arrangements.

Figure 3A:
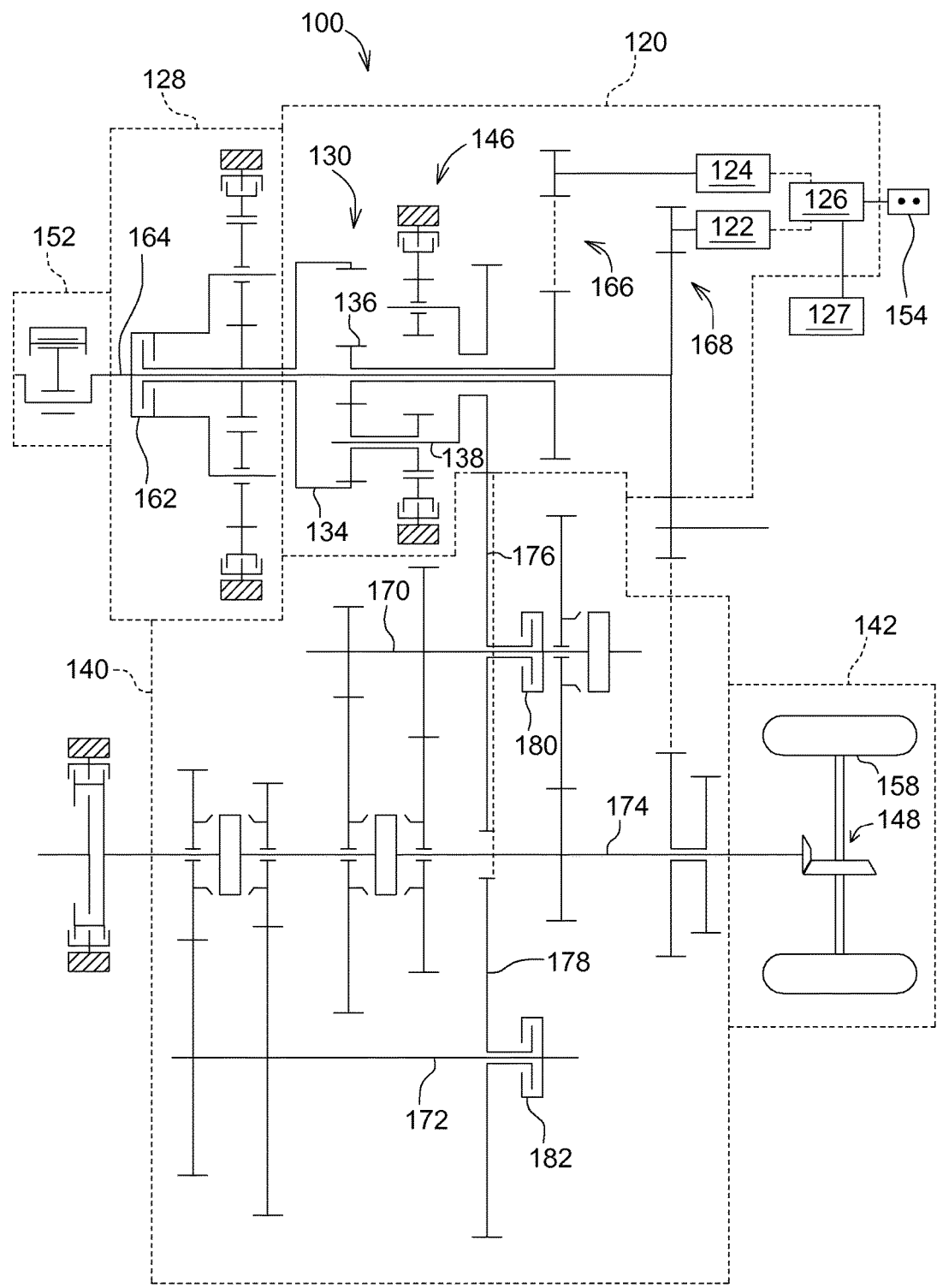

FIGS. 3A-3D provide building components already described in the preceding figures with numerals scaled up by a factor of 100. FIG. 3A shows a drive arrangement of the agricultural work vehicle in which a drive motor 152 in form of a combustion engine transfers its drive power via a switchable, reversible planetary gear 128 that can be added as needed, and a transmission device 100 to a drive system 142. The drive system 142 may have a differential gear 148 and a rear drive axle 144 having wheels 158. The transmission device 100 may have an electric variator 120, consisting of a compound gear train 130 in the form of a planetary gear and a first electric machine 122, and a second electric machine 124 for stepless setting of a gear shift ratio for the compound gear train 130, and a transmission with variable transmission 140 in the form of a group transmission with, in this example, five shifting groups A, B, C, D and E. The variator 120 corresponds to the configuration, in which, after a gear shift has been performed for transmission 140, a gear shift jump may be performed in the second electric machine 124. An addable creeper may be arranged immediately downstream of the planetary gear 130, if required. The two electric machines 122, 124 are connected via the controller 126 with the AEF connector 154. More drives, which are not shown, may be provided; for example an output for a power-take-off shaft drive or an output for a front-wheel drive, which can be activated as needed.

The planetary gear box 130 is driven by the drive motor 152 via the ring gear 134 of the planetary gear box 130, and the output in the direction of transmission 140 is provided by the planetary carrier 138 of the planetary gear 130. To this end, the ring gear 134 can be in driving connection with the input shaft 164 of the drive motor 152. The second electric machine 124 is in driving connection with the sun gear 136 of the planetary gear 130 via a first spur gear stage 166, in order to steplessly vary the transmission ratio between the driven ring gear 134 and the planetary carrier 138 of the planetary gear 130. The first electric machine 122 is in driving connection with the drive shaft 164 of the drive motor 152 via a second spur gear stage 168.

The transmission 140 in the present example of an embodiment is designed as a dual-clutch transmission having a first countershaft 170, a second countershaft 172 and an output shaft 174. The planet carrier 138 of the planetary gear 130 is in a gear engagement with a first tooth gear 176 on the first countershaft 170 and with a second tooth gear 176 on the second countershaft gear 172. The first tooth gear 176 can be brought into drive connection with the first countershaft 170 via a switching element 180, and the second tooth gear 178 can be brought into drive connection with the second countershaft 172 via a switching element 182. Starting from the countershafts 170, 172 a power flow can be switched via a tooth gear connection and controller elements, which is not described in more detail, to the output shaft 174, which in turn drives the drive system 142.

FIG. 3B shows a rotational-speed diagram in which for the five gear shift regions A, B, C, D, E of the transmission 140 the rotational speed profiles of the second electric machine 124 are graphed over the driving speed of the work vehicle 150. The second electric machine 124 is in the generator mode when the amount of the speed is positive, i.e. in the top half of FIG. 3B. When external power is not needed, the electric power generated in generator mode may either be circulated as reactive power by the first electric machine 122 operating in the motor mode, or it can be used to cover an existing external power requirement. If there is an external power requirement, an appropriate choice of the respective gear shift region of the transmission 140 allows the second electric machine 124 to power through its rotational speed curves as continuously as possible within the area that corresponds to a generator mode. This can be accomplished when a change of the gear shift region of the transmission 140 occurs when the lowest vehicle speed that can be achieved with a rotational speed of the second electric machine 124 is below the driving speed that is associated with the next lower speed characteristic of the second electric machine 124 at the point where this lower speed characteristic between generator and motor mode changes. Thus, if there is an external power requirement, the second electric machine 124 can be operated as a generator by appropriate selection of the gear ratio region of transmission 140 and at the same time, provided the external power requirement cannot be covered by the second electric motor 124 alone, the first electric machine 122 is also operated as a generator, since it is not needed to receive any electric power in order to circulate it in the engine operating mode as reactive power.

FIG. 3C shows an area of electric powers of the two electric machines 122, 124, graphed over a section of the driving speed of the work vehicle 150 for three gear shift regions A, B, C of the transmission 140. The dashed-pointed curve corresponds to the electric power of the second electric machine 124 and the dashed curve to the electric power of the first electric machine 122. There may be no external power requirement. FIG. 3C shows the result of a calculation of the electric power that results from a rotational speed of 1900 U of the drive motor 152 in and with full capacity utilization of the drive motor 152. Opposite power curve signatures of the powers of two electric machines 122, 124 are seen. The work vehicle 150 accelerates in the first gear shift region of the transmission 140. In this gear shifting region the second electric machine 124 is initially operated in the generator mode and the first electric machine 122 in motor mode, so that reactive power circulates in the variator 120. This reactive power flow continues until the operational modes of the two electric machines 122, 124 is changed, so that the second electric machine 124 is operated in the generator mode and the first electric machine 122 is operated in the generator mode and reactive power is not circulated. Once the two electric machines 122, 124 have again reached the height of their maximum power value, a shift to the second gear shift region B of the transmission 140 occurs and the working vehicle 150 further accelerates. Both for this and for the other gear shift region C of the transmission 140 shown, the curves of the electric performance of the two electric machines 122, 124 correspond, as just described for the gear shift region A, i.e. after shifting in the gear shift region, the reactive power initially circulates in the compound gear train 130 until, with further acceleration, the second electric machine 124 is operated in motor mode and the first and the first electric machine 122 is operated in generator mode.

FIG. 3D shows the result of a calculation of the electric power using the gear shift control method according to another embodiment. Here too, a speed of 1900 revolutions per minute of the drive motor 152 is assumed with full power capacity of the drive motor 15. Further, a maximum power transmitted externally in the amount of X kW is assumed in order to cover an external power requirement. The amount of X kW external power to be dispensed externally is merely an example value for the present calculation and this disclosure should not be limited to any one value. Compared with FIG. 3B, FIG. 3C shows basically identical electric powers curvatures of the two electric machines 122, 124.

In one nonexclusive embodiment, after a gear shift change of the manual transmission 140, the two electric machines 122, 124 change their modes of operation. Further, while passing through the gear shift regions, the electric power of the two machines 122, 124 run with an opposite inclination to each other and intersect within a gear shift region. In contrast to FIG. 3B, in FIG. 3C, the shifting points between the gear shift regions of the transmission 140 are selected with the curvatures in FIG. 3C earlier relative to the driving speed and the areas in which both of the electric machines 122, 124 are operated in generator mode, are larger and/or wider relative to the driving speed. Compared with FIG. 3B, in which within certain areas a power component circulates as reactive power in the variator 120, with the transmission control methods according to the embodiment shown in FIG. 3C this power component is provided via the controller 126 as external power to an external electric consumer and does not circulate, at least predominantly, in the variator 120. In FIG. 3C only relatively small areas relative to the vehicle speed can be detected in which reactive power circulates in the variator 120. In these areas the power generated by the second electric machine 124 in generator mode exceeds the externally provided power of X kW, so that the first electric machine 122 is operated in machine mode in order to absorb this excess power, which then circulates as reactive power in the variator 120. Areas can also be seen in FIG. 3C in which the second electric motor 124 is operated in motor mode and the first electric machine 122 is operated in generator mode, whereby, however, the electric power generated by the first electric machine 122 exceeds the electric power received by the second electric machine 124 so that the excess power above the requirement of the second electric machine 124 can be provided as external power.

In the following description and with reference to FIGS. 4A to 5B, drive arrangements of an agricultural work vehicle are provided with a configuration that during a gear shift change of the transmission 240, 340 does not need, or needs only a very small rotational speed change of the second electric machine 224, 324.

Figure 4A:
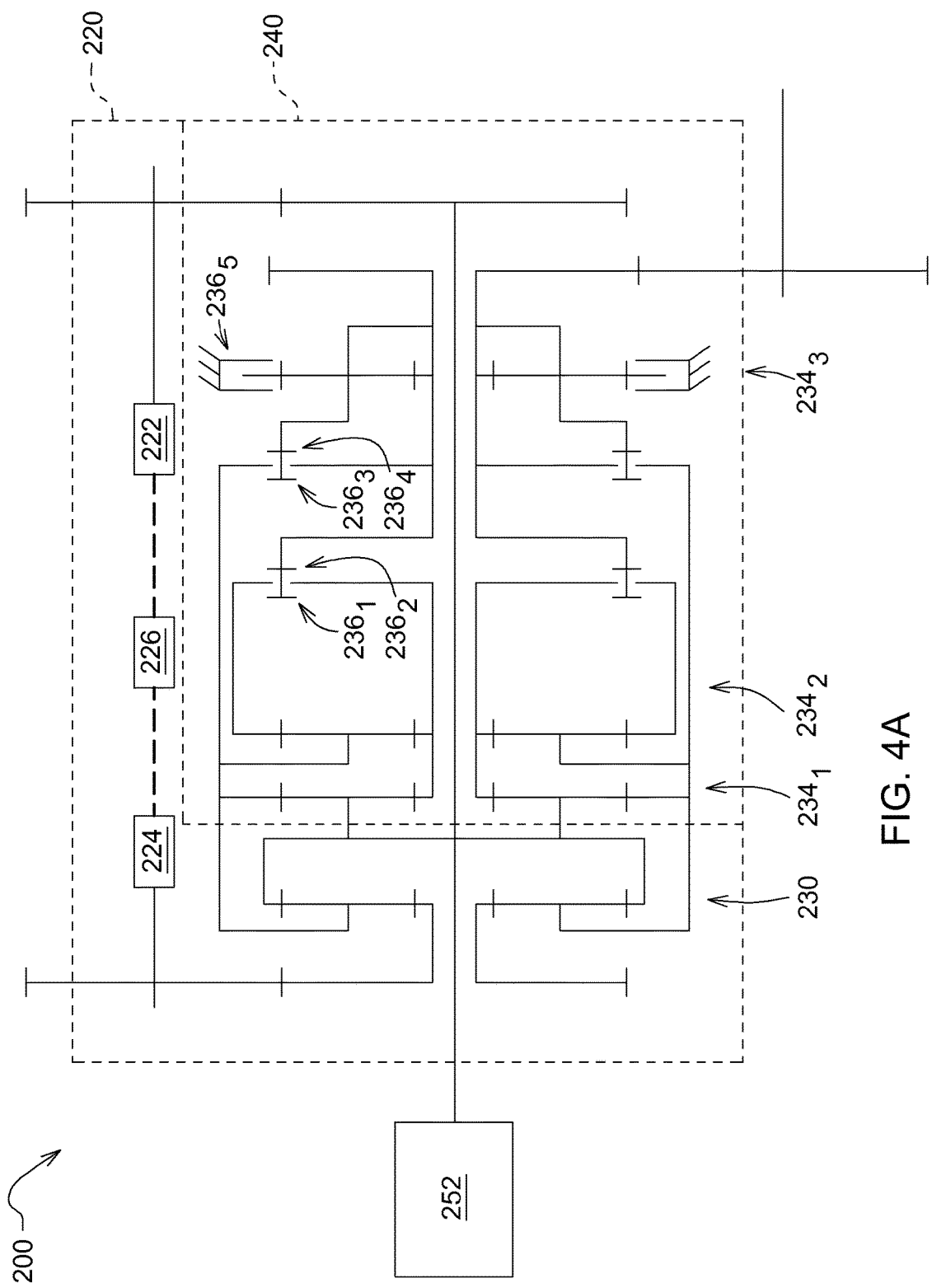
FIG. 4A is a schematic of another embodiment of a drive arrangement schematic for carrying out a gear shift control method.

In the FIGS. 4A-4B, building components already described in the preceding figures are provided with numerals scaled up by a factor of 100. FIG. 4A shows a transmission 200 driven by a drive motor 252 driven for an agricultural work vehicle with a variator 220 and a transmission 240 having three planetary gears $234_1$-$234_3$ and five switching elements $236_1$-$236_5$. The variator 220 may have a compound gear train 230, a first and a second electric machine 222, 224, and a controller 226. A description of the operational mode of the transmission 200 shown in FIG. 4A is omitted. FIG. 4B shows a rotational-speed diagram in which the speed profile of the second electric machine 224 are graphed within the four gear shift regions of the transmission device 200 over the driving speed of the work vehicle. The second electric machine 224 is located in the region of each speed course in the generator mode, which follows to the left to the zero crossing of the respective speed curve. If there is an external power demand, a suitable selection of the pre-set gear shift region of the transmission 240 allows the second electric machine 224 to operate in continuous generator mode, to the extent possible, when the lowest driving speed that can be reached with the speed characteristic of the second electric machine 224 is below the driving speed that can be reached with the next lowest speed characteristic of the second electric machine 224 at the point at which this lower speed characteristic changes between generator and motor mode.

Figure 5A:
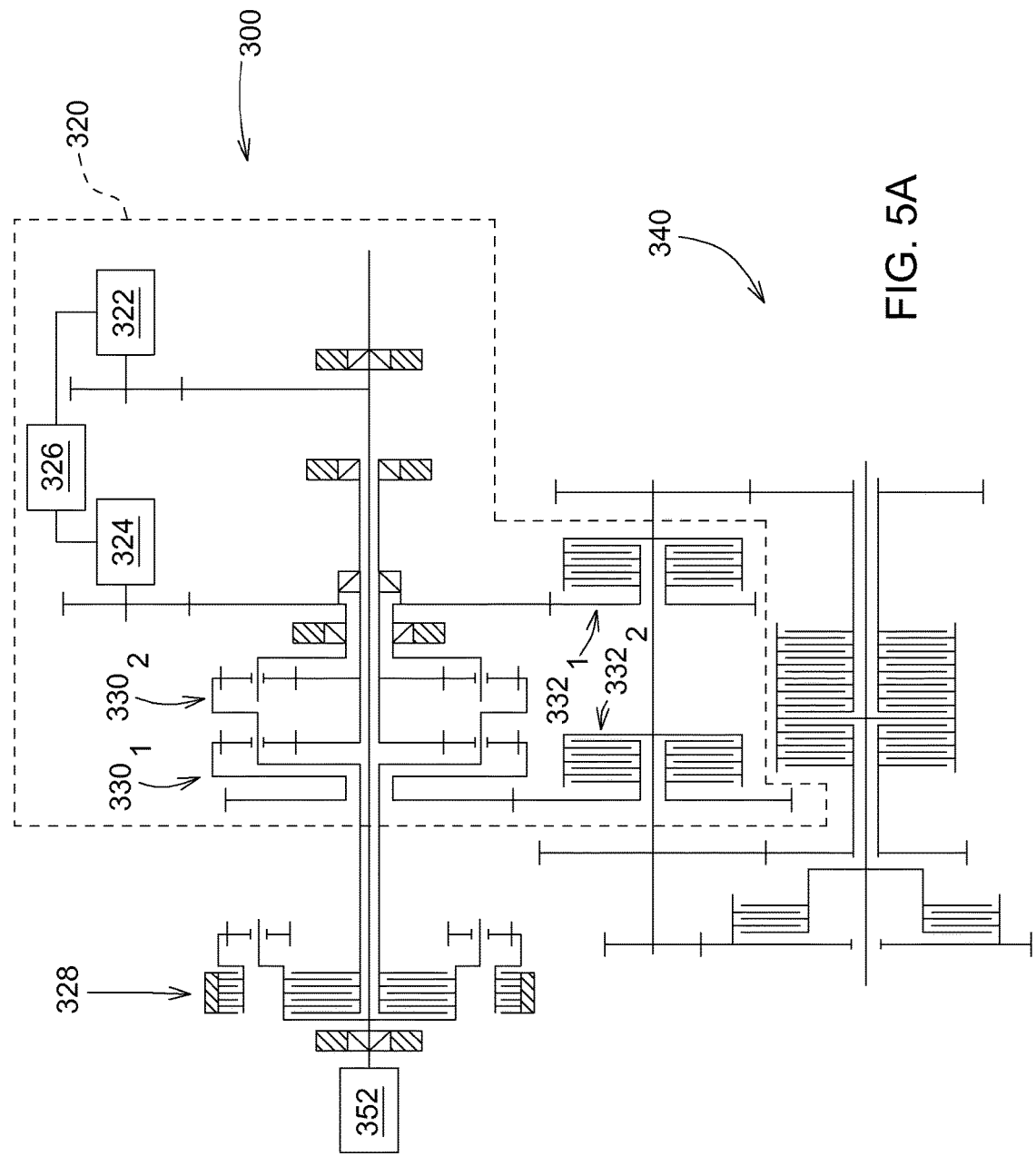
FIG. 5A is a schematic of another embodiment of a drive arrangement for carrying out the gear shift control method.

In FIGS. 5A-5B the building components already described in the preceding figures are provided with numerals scaled up by another factor of 100. FIG. 5A shows a transmission 300 driven by a drive motor 352 of an agricultural work vehicle with a variator 220 and a group range gear 340 with three shift arrangements. A reversing gear 328 may be provided between the drive motor 352 and the variator 320. A creeper, not shown, may also be provided. The variator 320 may have two compound gear trains $330_1$, $330_2$, a first and a second electric machine 322, 324, a controller 326 and two gear shift regions $332_1$, $33^2_2$, through which the power flow is directed into the range gear box 340. As a result of two compound gear trains $330_1$, $330_2$ and the three shift groups of the range gear 340, six gear shift regions are formed in the transmission 300. A further description of the operational mode of the transmission 300 according to FIG. 5A is omitted.

FIG. 5B shows a rotational-speed diagram in which for the six gear shift regions of the transmission 300 the speed profiles of the second electric machine 324 are graphed over the driving speed of the working vehicle. Regarding the description of the rotational speed diagram of FIG. 5B, reference is made to the corresponding description to the FIG. 4B, since the speed curves of FIGS. 4B and 5B qualitatively correspond.

Figure 6A:
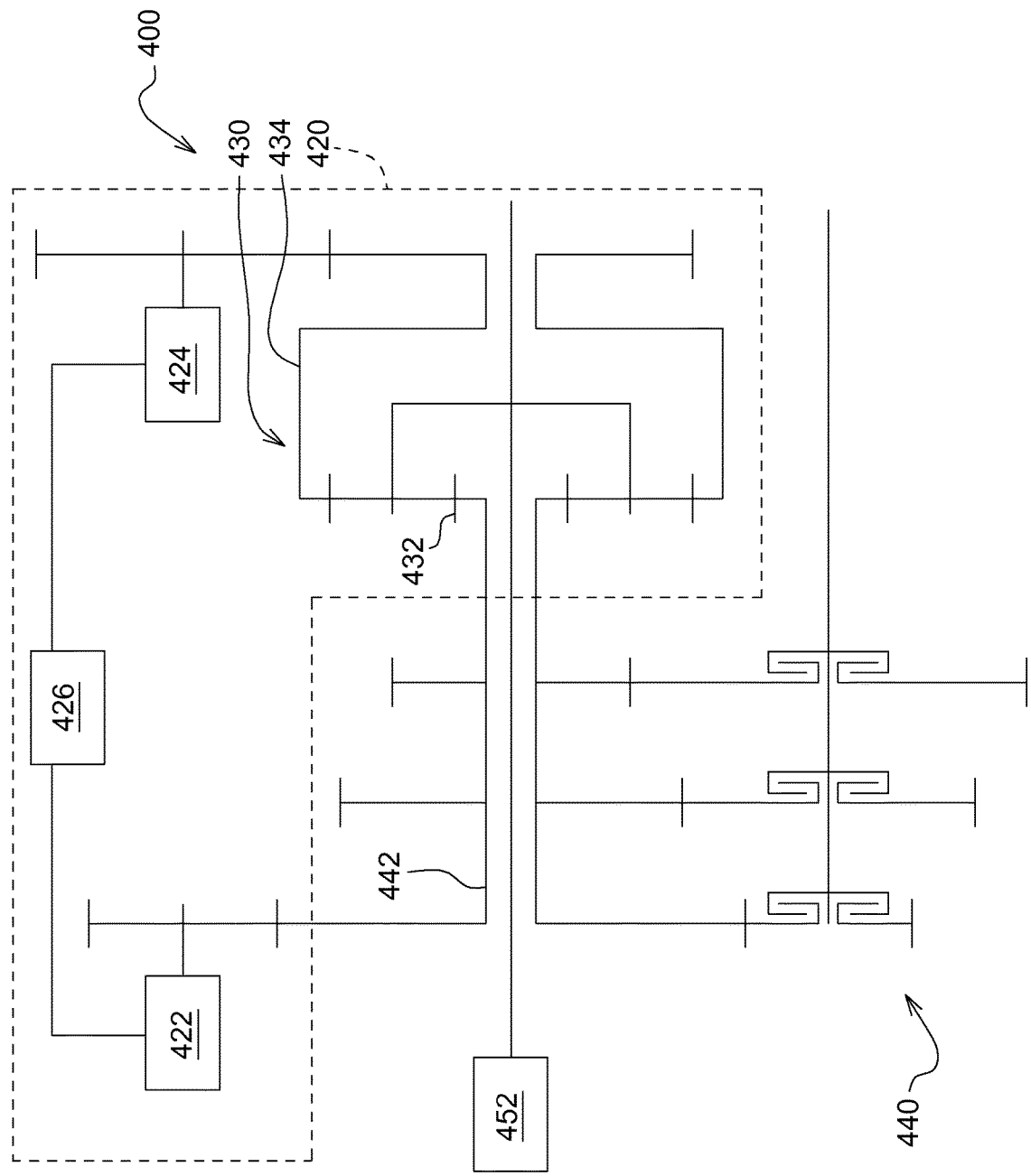
FIG. 6A is a schematic of another embodiment of a drive arrangement for carrying out the gear shift control method.

In FIGS. 6A-6B, the building components already described in the preceding figures are provided with numerals scaled up again by a factor of approximately 100. FIGS. 6A and 6B show an output coupled transmission 400 driven by a drive motor 452 having a variator 420 and a range gear 440 with three shifting arrangements. The variator 420 may have a compound gear train 430, a first and a second electric machine 422, 424, and a controller 426. The first electric machine 422 is driven by the sun gear 432 of the compound gear train 430, whereby the drive is directed via a ring shaft 442 through the range gear box 440. The second electric machine 424 is driven by the ring gear 434 of the compound gear train 430. A description of the functional mode of the transmission device 400 according to FIG. 6A is omitted.

FIG. 6B shows a rotational-speed diagram in which for the three gear shift regions of the transmission 400 the rotational speed curves of the second electric machine 424 are graphed over the driving speed of the work vehicle. Regarding the description of the rotational-speed diagram of FIG. 5B, reference is made to the corresponding description relating to FIG. 3B, since the speed curves of FIGS. 3B and 6B qualitatively correspond, with the difference that in FIG. 6B the second electric machine 424 is in generator mode when the amount of rotational speed is negative, i.e. in the bottom half of FIG. 6B.

In FIGS. 7A-7B the building components already described in the preceding figures are provided with numerals scaled up again by a factor of approximately 100. FIGS. 7A and 7B each show an embodiment of a compound-coupled transmission 500, 600. A compound-coupled configuration may have close interaction between both electric machines 522, 624, 522, 624 as neither is directly coupled to an input speed or output speed of a compound gear train. Instead, each of the electric machines can be controlled such that they can be proportionately and complementary operated by voltage regulation or by rotational speed. In the illustrated compound coupled transmission 500, 600, the transmission 540, 640 can also be operated in a gear shift region that allows both electric machines 522, 624, 522, 624 to be operated in generator mode.

As a result of the previously described embodiments, in one gear shift control of the transmission device, both electric machines may operate in the generator modes, which results in an increase of the overall efficiency of the transmission. In addition, the gear shift control method makes it possible to generate a relevant amount of electric power using the existing transmission.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for controlling a power-split gear shift device in a vehicle, comprising:
    providing a transmission with variable gear shift for connecting a drive motor to a traction drive of the vehicle, an electric variator having a compound gear train with at least one first electric machine and at least one second electric machine, and a controller of the first and second electric machines for steplessly varying a gear shift of the compound gear train;
    detecting an external power requirement by an electric consumer;
    setting a gear shift region of the transmission with variable gear shift;
    operating the first electric machine and the second electric machine, the first electric machine being operated in a generator mode; and
    compensating for an existing power deficit or a power excess relative to an external power demand.

2. The method of claim 1, wherein the setting step comprises setting a gear shift of the transmission based on a driving resistance, the external power demand, and a desired vehicle speed.

3. The method of claim 1, further comprising:
providing an energy storage unit coupled to the control; and
using the energy storage unit to compensate for the power excess or deficit relative to the external power demand.

4. The method of claim 1, further comprising:
adjusting a torque of the electrical machines via the control independent of the rotational speed of the first and second electrical machines;
supplying energy into each of the electrical machines or an energy storage unit; and
operating each of the first and second electrical machines in the generator mode.

* * * * *